United States Patent [19]
Yaguchi et al.

[11] 4,048,088
[45] Sept. 13, 1977

[54] NEMATIC LIQUID CRYSTAL COMPOSITIONS

[75] Inventors: Mashachika Yaguchi, Yokohama; Kenji Nakamura, Kamakura, both of Japan

[73] Assignee: Dai Nippon Toryo Kabushiki Kaisha, Osaka, Japan

[21] Appl. No.: 679,586

[22] Filed: Apr. 23, 1976

Related U.S. Application Data

[62] Division of Ser. No. 501,923, Aug. 30, 1974, Pat. No. 3,989,639.

[30] Foreign Application Priority Data

Aug. 31, 1973 Japan .................. 48-97216
Aug. 31, 1973 Japan .................. 48-97217

[51] Int. Cl.$^2$ ............................ C09K 3/34; G02F 1/13
[52] U.S. Cl. ..................... 252/299; 252/408; 350/160 LC
[58] Field of Search .............. 252/299, 408; 350/160 LC

[56] References Cited

U.S. PATENT DOCUMENTS

| 3,796,479 | 3/1974 | Helfrich et al. | 350/160 LC |
| 3,815,972 | 6/1974 | Hsieh | 350/160 LC |
| 3,983,049 | 9/1976 | Aftergut et al. | 252/299 |
| 3,988,054 | 10/1976 | Yaguchi et a. | 350/160 LC |

FOREIGN PATENT DOCUMENTS

| 2,439,703 | 5/1975 | Germany | 252/299 |
| 4,731,883 | 11/1972 | Japan | 252/299 |
| 4,892,284 | 11/1973 | Japan | 252/299 |

OTHER PUBLICATIONS

Dave, J. S., et al., J. Chem. Soc., part 4, pp. 4305-4309 (1955).
Dave, J. S., et al., Mol. Cryst. Liq. Cryst., vol. 2, pp. 125-134 (1966).
Dave, J. S., et al., J. Chem. Soc.(A), pp. 1473-1478 (1967).

Primary Examiner—Benjamin R. Padgett
Assistant Examiner—T. S. Gron
Attorney, Agent, or Firm—Sughrue, Rothwell, Mion, Zinn and Macpeak

[57] ABSTRACT

When azo type and/or azoxy type compounds having specific structures are incorporated into a nematic liquid crystal material, a liquid crystal composition having positive dielectric anisotropy and a broad mesomorphic range extending above and below room temperature can be obtained. An electro-optical device in which a thin layer of this liquid crystal composition is filled and supported between two substrates can be used for light modulation and display.

10 Claims, No Drawings

NEMATIC LIQUID CRYSTAL COMPOSITIONS

This a Division of application Ser. No. 501,923, filed Aug. 30, 1974, now U.S. Pat. No. 3,989,639.

BACKGROUND OF THE INVENTION

This invention relates to a nematic liquid crystal composition having positive dielectric anisotropy.

It is known that a nematic liquid crystal material (hereinafter referred to as "N-liquid crystal") can be used for display, light modulation and the like by utilizing its specific property that optical characteristics are changed under application of electric fields, magnetic fields, ultrasonic waves and the like. Such devices comprise, in general, an N-liquid crystal filled and supported between two substrates disposed to confront each other with a distance smaller than about 50 $\mu$, at least one of which is transparent, and the change in the molecular arrangement caused under application of electric fields, magnetic fields, ultrasonic waves and the like is utilized for light modulation. When electric fields are applied, electrode plates in which a thin conductive layer is applied on one surface of a support such as glass plates are used as said substrates.

Compounds forming such N-liquid crystal are divided into two types depending on the relationship between the molecular structure and dielectric property, one type being characterized in that the longer axis and electric dipole of N-liquid crystal moleculars are substantially vertical to each other (the N-liquid crystal of this type will hereinafter be referred to as "Nn-liquidd crystal") and the other being characterized in that the longer axis and electric dipole of N-liquid crystal moleculars are substantially in parallel (the N-liquid crystal of this type will hereinafter be referred to as "Np-liquid crystal"). Accordingly, the Nn-liquid crystal indicates an N-liquid crystal having negative dielectric anisotropy, and the Np-liquid crystal indicates an N-liquid crystal having positive dielectric anisotropy.

The conventional Np-liquid crystal electro-optical devices are composed of a pair of electrode plates disposed to confront each other and a Np-liquid crystal layer interposed between said two plates. In this case, the molecular axis of the Np-liquid crystal are in parallel with the electrode face and are arranged in the substantially same direction in a plane parallel to the electrode plate. If seen from the direction vertical to the electrode plate, molecular axes are arranged in the state continuously distorted from one another between adjacent planes. Such an orientation of molecular axes is provided by rubbing the electrode face along one direction with cloths, paper or the like, piling the two electrodes thus treated so that the rubbing directions are at right angles to each other and injecting the Np-liquid crystal between so piled electrodes. The molecular axes near by the electrode face are oriented along the rubbing direction while the molecular axes within the layer of the liquid crystal are oriented in the state continuously distorted from one another. When polarized light passes through this liquid crystal layer, the polarization plane of the light is rotated depending on the degree of distortion. This distortion can be relaxed by application of an appropriate electric field. Accordingly, by adjusting the intensity of the electric field it is made possible to adjust rotation of the polarization plane of polarized light passing through the device.

When the Np-liquid crystal device is interposed between two polarizers, it changes from the light-shielding state to the light-transmitting state or from the light-transmitting state to the light-shielding state depending on the applied voltage, and this light modulation can be utilized for display.

Since the light modulation process utilizing the Np-liquid crystal device provided between two polarizers disposed in such a way that the oscillation planes of light cross to each other exhibits a mechanism quite different from a Nn-liquid crystal electro-optical device, a higher contrast ratio can be obtained in use for display of a pattern. Further, the Np-liquid electro-optical device can be utilized for construction of a Boolean algebra generator, a logical product gate, a NOR-gate and a more complicated logical circuit. If Np-liquid crystal electro-optical devices capable of responding quickly are employed, it can be utilized for display of a three-dimensional television or moving picture.

The threshold voltage value causing DSM in Nn-liquid crystal electro-optical devices is about 7 to about 10 $V_{RMS}$ and the saturation voltages value is about 40 $V_{RMS}$, and the Nn-liquid crystal electro-optical device is generally operated under about 25 to about 40 $V_{RMS}$. In contrast, in the case of the Np-liquid crystal electro-optical device, the threshold voltage value is about 1.5 to 4 $V_{RMS}$ and the saturation voltage value is about 7 to about 10 $V_{RMS}$. Accordingly, a lower voltage electric source can be used, and the consumption of electric power can be reduced and the life of the device can be prolonged. Further, in the case of the Np-liquid crystal electro-optical device, since the wavelength region of transmission light varies depending on the electric voltage within the range of the threshold voltage value to the saturation voltage value, it can be used for display of colors. Moreover, also an apparatus comprising the Np-liquid crystal device in which the direction of rubbing electrode faces are arranged in parallel can be used for display of colors.

In case an Np-liquid crystal electro-optical device is so constructed that the molecular axis directions are random between substrates, the light is scattered when no electric field is applied to the device, and when an electric field is applied, the quantity of transmission light increases because molecular axes are oriented vertically to the substrates. In this case, use of a polarizer is unneccessary.

Most of N-liquid crystals that are presently known in the art are Nn-liquid crystals, and N-liquid crystal materials and their compositions which take a nematic mesophase at room temperature and have a positive dielectric anisotropy are hardly known in the art.

In Japanese Patent Application KOKAI No. 18783/72, it is disclosed that a mixture of an Nn-liquid crystal material and 4-cyano-benzylidene-4'-n-alkylaniline is a liquid crystal composition having the same electro-optical characteristics as those of an Np-liquid crystal.

SUMMARY OF THE INVENTION

It is therefore a primary object of this invention to provide a liquid crystal composition having a broad mesomorphic range covering temperatures above and below room temperature and having the same electro-optical characteristics as those of an Np-liquid crystal.

Another object of this invention is to provide an electro-optical device capable of being operated under the relatively low threshold and saturation voltage values and exhibiting a positive dielectric anisotropy.

The foregoing objects can be attained by incorporating azo type and/or azoxy type compounds having specific structures into Mn- or Np-liquid crystal materials. Such compounds can be represented by the formula

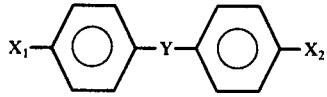

I wherein $X_1$ is $-NO_2$ or halogen, $X_2$ is hydrogen or $-R$ or $-OR$ radicals wherein R is alkyl groups of 1 to 18 carbon atoms, and Y is $-N=N-$ or

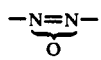

radicals.

DETAILED DESCRIPTION OF THE INVENTION

The azo type and/or azoxy type compounds having the specific structure of Formula I in mixture with either the Np-liquid crystal materials or the Nn-liquid crystal materials can impart the same electro-optical characteristics as those of the Np-liquid crystal material. These compounds are, hereinafter, referred to as "positive dielectric anisotropy-imparting agent".

These positive dielectric anisotropy-imparting agents have structures similar to those of N-liquid crystal materials and therefore, exhibit homogeneous miscibility when incorporated into the N-liquid crystal materials.

Examples of the positive dielectric anisotropy-imparting agent represented by the above Formula I are as follows:

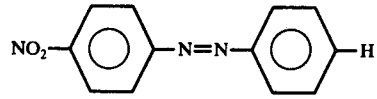

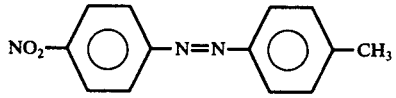

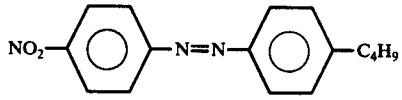

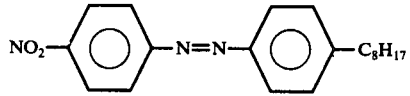

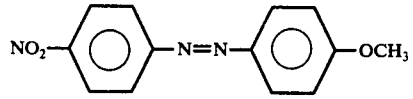

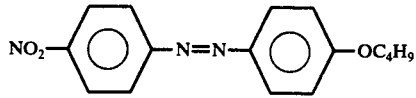

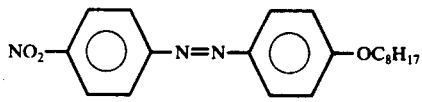

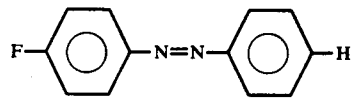

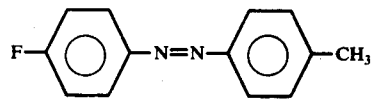

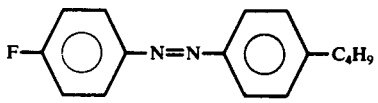

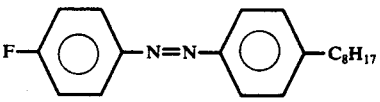

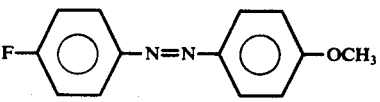

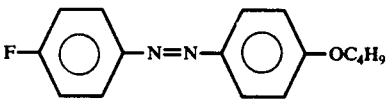

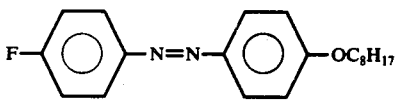

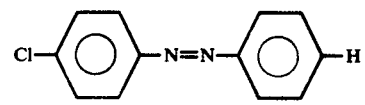

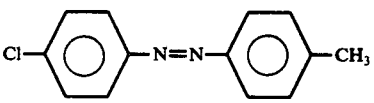

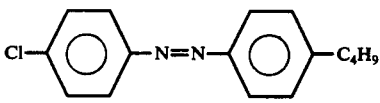

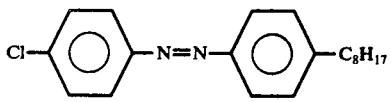

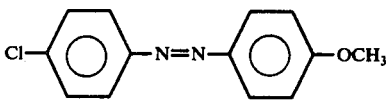

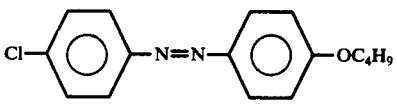

-continued
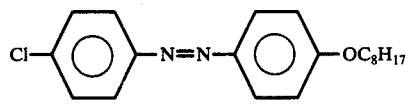
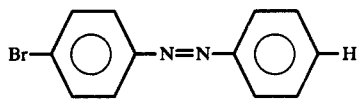
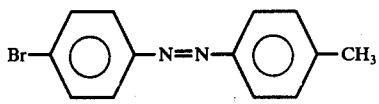
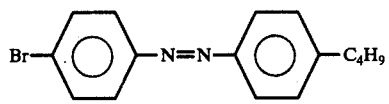
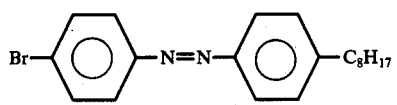
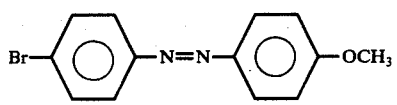
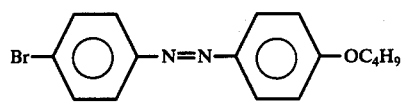
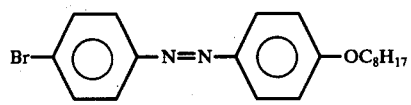
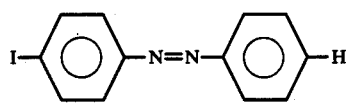
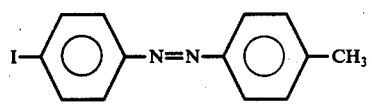
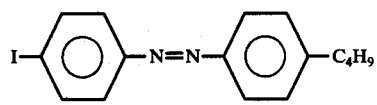
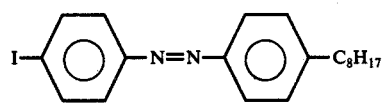
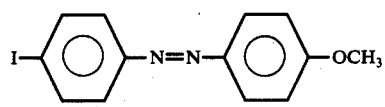
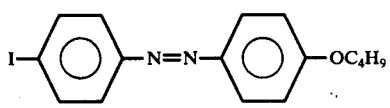
-continued
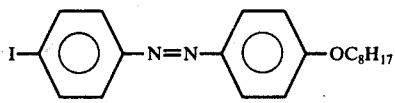
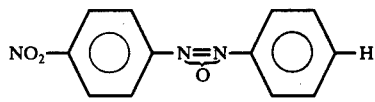
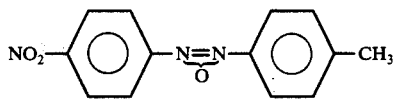
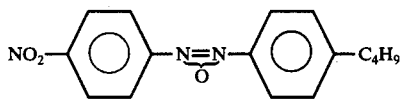
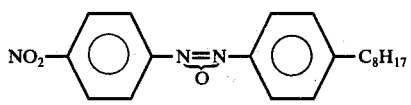
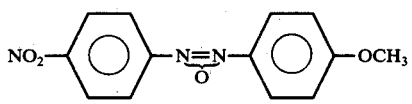
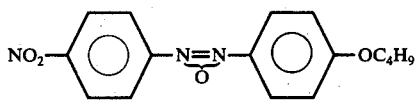
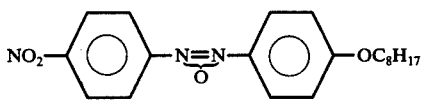
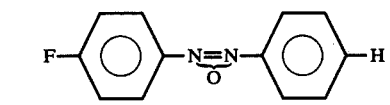
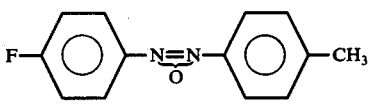
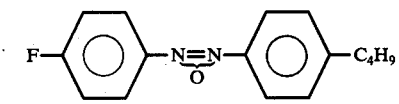
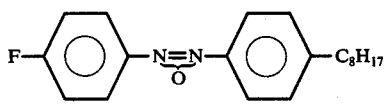
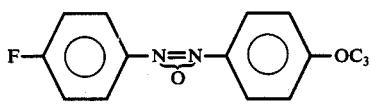
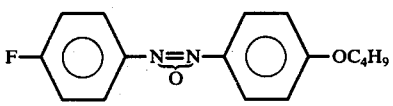

-continued

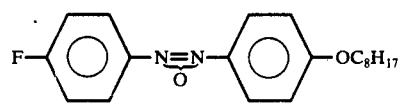
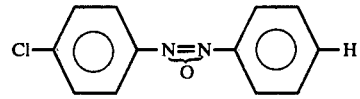
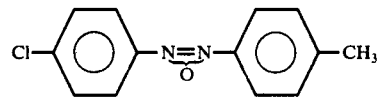
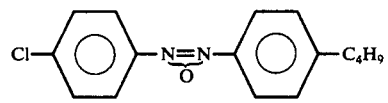
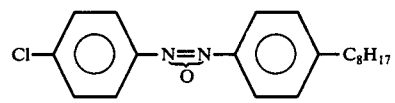
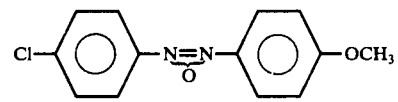
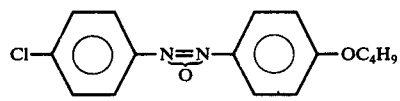
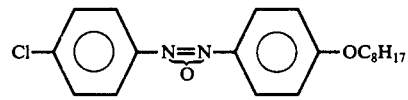
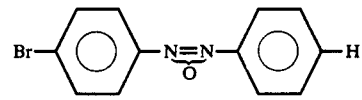
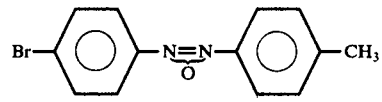
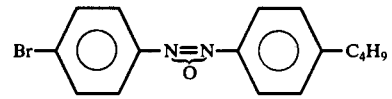
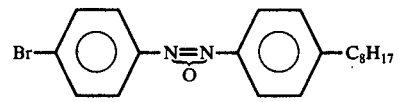
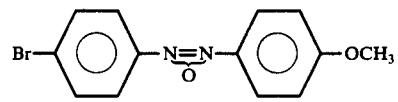
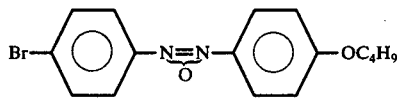

-continued

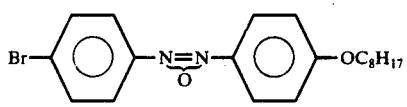
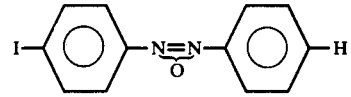
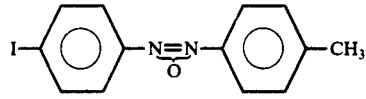
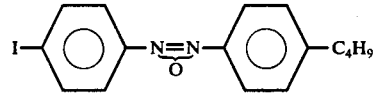
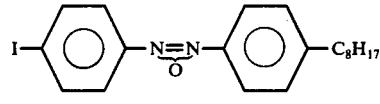
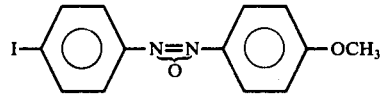
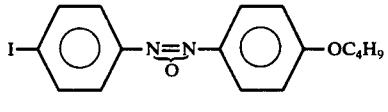
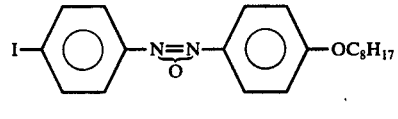

N-liquid crystal materials which may be used in this invention include all of the usually known ones which have, in general, a structure represented by the formula,

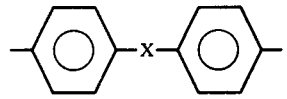

and they are classified into the Schiff base, azo, azoxy, ester, α-chlorostilbene and nitron types depending on the structure of the central group X.

The Schiff base type is a group of compounds represented by the formula,

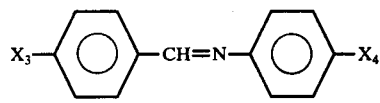

II wherein $X_3$ is alkoxy of 1-4 carbon atoms and $X_4$ is alkyl of 3-8 carbon atoms, or one of $X_3$ and $X_4$ is cyano and the other is alkoxy of 1-8 carbon atoms or alkyl of 3-8 carbon atoms, and the formula,

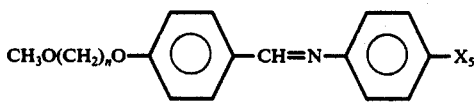

III wherein $X_5$ is alkyl of 2-8 carbon atoms and $n$ is 2 or 3.

The azo type is a group of compounds represented by the formula,

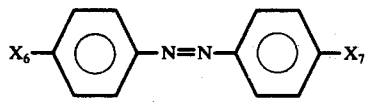

IV wherein $X_6$ and $X_7$ each is an alkyl or alkoxy group of 1-8 carbon atoms, or one of $X_6$ and $X_7$ is cyano and the other is an alkyl or alkoxy group of 1-8 carbon atoms.

The azoxy type is a group of compounds represented by formula,

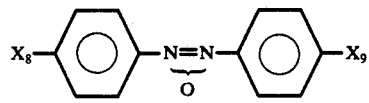

V wherein $X_8$ and $X_9$ each is an alkyl or alkoxy group of 1-8 carbon atoms, or one of $X_8$ and $X_9$ is cyano and the other is an alkyl or alkoxy group of 1-8 carbon atoms.

The ester type is a group of compounds represented by the formula,

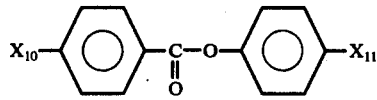

VI wherein $X_{10}$ is an alkyl or alkoxy group of 1-8 carbon atoms or acyloxy

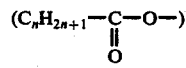

or monoalkyl carbonic acid ester

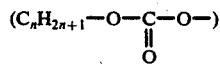

groups
wherein $n$ is an integer of 1 to 8 and $X_{11}$ is an alkyl or alkoxy group of 2-8 carbon atoms, or one of $X_{10}$ and $X_{11}$ is cyano and the other is an alkyl or alkoxy group of 2-8 carbon atoms.

The α-chlorostilbene type is a group of compounds represented by the formula,

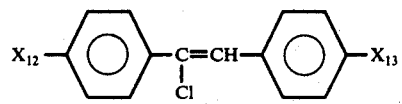

VII

Wherein one of $X_{12}$ and $X_{13}$ is alkyl of 4-8 carbon atoms and the other is alkoxy of 1-8 carbon atoms, or one of $X_{12}$ and $X_{13}$ is cyano and the other is alkyl of 4-8 carbon atoms or alkoxy of 1-8 carbon atoms.

The nitron type is a group of compounds represented by the formula,

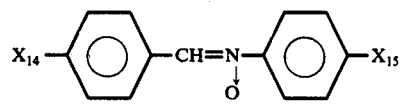

VIII wherein $X_{14}$ is alkoxy of 1-4 carbon atoms and $X_{15}$ is alkyl of 1-8 carbon atoms.

The positive dielectric anisotropy-imparting agent may be incorporated with the N-liquid crystal material in an amount of normally more than about 0.5% by weight, preferably 2 to 50% by weight based on the obtained composition.

The amount of the agent may be decided appropriately within this range depending on the type of the N-liquid crystal material used. When the positive dielectric anisotropy-imparting agent is incorporated with the Nn-liquid crystal material, there is formed an Np-liquid crystal composition characterized in that no dynamic scattering takes place when electric fields are applied thereto. In case the positive dielectric anisotropy-imparting agent is incorporated with the Np-liquid crystal material, there is formed an Np-liquid crystal composition characterized in that a minimum electric voltage causing the change in the molecular orientation under application of an electric field, namely the threshold voltage, is reduced.

According to this invention, the liquid crystal compositions having a broad mesomorphic range extending above and below room temperature and the same electro-optical properties as those of Np-liquid crystal materials can be obtained by incorporating the positive dielectric anisotropy-imparting agent into the Nn-liquid crystal compound and its composition. As the Np-liquid crystal materials, the compounds of Formulae II to VIII having a cyano radical, such as p-cyanobenzylidene-p'-n-butylaniline and the like are presently known in the art, but mesomorphic ranges of these compounds are generally above room temperature. If the positive dielectric anisotropy-imparting agent of Formula I is incorporated into such Np-liquid crystal compounds or their composition, the mesomorphic range can be lowered to a level approximating room temperature. In this case, the positive dielectric anisotropy-imparting agent may be added in a lesser amount, for example, less than about 10% by weight.

This invention will now be illustrated in detail by reference to the following non-limitative Examples. It has been confirmed that when electro-optical devices comprising a thin layer of N-liquid crystal compositions of Examples 1 to 15 filled and supported between two substrates are used for light modulation apparatus as described hereunder, the N-liquid crystal compositions exhibit the positive dielectric anisotropy.

The liquid crystal device was prepared by placing a glass plate provided with a conductive layer of $SnO_2$ and lead wire on a flat flannel, rubbing the surface of the glass plate with the flannel at once under a press of 500 g/cm² along one direction over a length of 20 cm, fixing a spacer of a polyethyleneterephthalate film of 18 μ in thickness on the surface of one of two glass plates so treated, filling with a liquid crystal material composition, placing the other glass plate thereon in such a way that the two rubbing directions fall at right angles with each other, and fixing the two plates at the end with a clip. The liquid crystal device thus obtained was provided between a pair of polarizing plates of which lattices cross each other vertically. When the quantity of transmission light changed in accordance with the applied electric voltages, the liquid crystal material composition was identified to be Np-liquid crystal.

EXAMPLE 1

95–70 Weight % of a Schiff base type equi-weight mixture, having a mosmorphic range of −15° C to 60° C, of p-methoxybenzylidene-p′-n-butylaniline (MBBA) and p-ethoxybenzylidene-p′-n-butylaniline (EBBA), as a Nn-liquid crystal composition were incorporated with 5–30 weight % of the positive dielectric anisotropy-imparting agent given in Table 1. The composition obtained thus was in form of homogeneous miscibility and exhibited a broad mesomorphic range extending above and below room temperature.

was incorporated with 20% by weight of a compound of the formula,

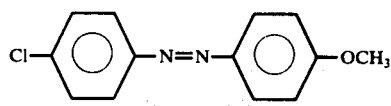

The composition obtained thus (Run No. 18) was in the form of homogeneous miscibility and exhibited a mesomorphic range of 3° – 78° C.

EXAMPLE 4

10% By weight of a compound of the formula,

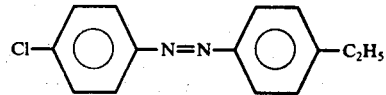

Table 1

| Run No. | Positive Dielectric Anisotropy-Imparting Agents | Amount of Addition, weight % | Mesomorphic Range, ° C |
|---|---|---|---|
| 1 |  | 5 | −18~43 |
| 2 | $NO_2$—〈○〉—N=N—〈○〉—$OC_2H_5$ | 10 | −10~19 |
| 3 |  | 20 | −25~20 |
| 4 |  | 30 | −26~20 |
| 5 |  | 5 | −12~45 |
| 6 | Cl—〈○〉—N=N—〈○〉—$C_2H_5$ | 10 | −15~38 |
| 7 |  | 20 | −20~35 |
| 8 |  | 30 | −12~30 |
| 9 |  | 5 | −3~53 |
| 10 | Cl—〈○〉—N=N—〈○〉—$OCH_3$ | 10 | 8~48 |
| 11 |  | 20 | 39~45 |
| 12 |  | 30 | 46~48 |
| 13 |  | 5 | −12~40 |
| 14 | Br—〈○〉—N=N—〈○〉—$OC_2H_5$ | 10 | −5~36 |
| 15 |  | 20 | −8~40 |
| 16 |  | 30 | −10~41 |

EXAMPLE 2

90 % By weight of an azo type mixture, having a mesomorphic range of 29° to 72° C, or 25% by weight of p-ethoxy-p′-n-amylazobenzene and 75% by weight of p-methoxy-p′-n-amylazobenzene, as a Nn-liquid crystal composition were incorporated with 10% by weight of a compound of the formula,

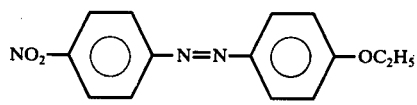

The composition obtained thus (Run No. 17) was in the form of homogeneous miscibility and exhibited a mesomorphic range of 15° – 61° C.

EXAMPLE 3

80% by weight of azoxy type equi-weight mixture, having a mesomorphic range of 10° – 87° C, of p-ethoxy-p′-n-hexylazoxybenzene and p-methoxy-p′-n-hexylazoxybenzene as a Nn-liquid crystal composition were incorporated with 90% by weight of ester type Nn-liquid crystal material of the formula,

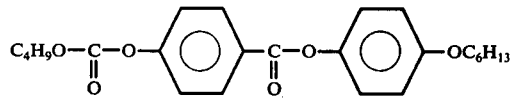

having a mesomorphic range of 44° – 84° C. The composition obtained thus (Run No. 19) was in the form of homogeneous miscibility and exhibited a mesomorphic range of 20° –52° C.

EXAMPLE 5

10% By weight of a compound of the formula,

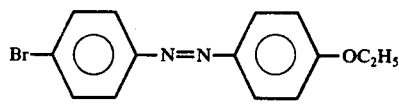

were incorporated with 90% by weight of an equi-weight mixture, having a mesomorphic range of −35° C to 76° C, of MBBA, EBBA, p-ethoxybenzylidene-p-′- n-heptylaniline (EBH$_p$A) and p-ethoxybenzylidene-p'-n-octylaniline as a Nn-liquid crystal composition. The composition obtained thus (Run No. 20) was in the form of homogeneous miscibility and exhibited a mesomorphic range of −40° to 59° C.

EXAMPLE 6

20% By weight of a compound of the formula,

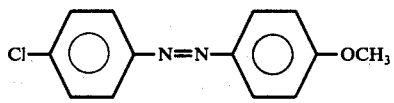

were incorporated with 80% by weight of a Np-liquid crystal mixture of p-cyanophenyl-p'-n-heptylbenzoate and p-cyanophenyl-p'-n-butylbenzoate in the weight ratio of 2 : 1, having a mesomorphic range of 25° to 50° C. The composition obtained thus (Run No. 21) was in the form of homogeneous miscibility and exhibited a mesomorphic range of 15° to 41° C.

EXAMPLE 7

10% By weight of a compound of the formula,

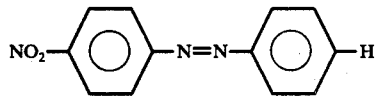

were incorporated with 90% by weight of an equi-weight mixture, having a mesomorphic range of −15° to 61° C, of MBBA and EBBA as a Nn-liquid crystal composition. The composition obtained thus (Run No. 22) was in the form of homogeneous miscibility and exhibited a mesomorphic range of −18° to 48° C.

EXAMPLE 8

A light modulation apparatus as mentioned hereinbefore was prepared with use of the specimens of Run Nos. 2, 6, 11, 15, 17, 18, 19, 20, 21 and 22 changing a crossing angle of the rubbing directions on two substrates and a crossing angle of two polarizers. Threshold and saturation voltage values and changes in transmission light according to the variation of the application of from the threshold voltage to the saturation voltage are indicated in Table 2.

Table 2

| Specimens, Run No. | Crossing Angle of Rubbing Directions | Crossing Angle of Polarizing Plates | Threshold Voltages($V_{RMS}$) | Saturation Voltages($V_{RMS}$) | Changes in Transmission Light |
| --- | --- | --- | --- | --- | --- |
| 2 | ⊥ | = | 3.1 | 5.0 | Black - White |
| 2 | 45° | ⊥ | 4.0 | 6.0 | White-Red-Blue |
| 6 | ⊥ | ⊥ | 3.0 | 8.0 | White-Black |
| 11 | ⊥ | = | 3.0 | 7.0 | Black-White |
| 15 | ⊥ | = | 4.2 | 8.0 | Black-White |
| 17 | ⊥ | = | 3.5 | 6.0 | Black-White |
| 18 | ⊥ | = | 2.5 | 4.5 | Black-White |
| 18 | 45° | ⊥ | 2.8 | 5.1 | White-Red-Blue |
| 19 | = | ⊥ | 3.1 | 7.5 | White-Blue-Red-Black |
| 20 | ⊥ | = | 4.3 | 9.2 | Black-White |
| 21 | ⊥ | = | 3.1 | 5.8 | Black-White |
| 22 | ⊥ | = | 2.8 | 6.0 | Black-White |

Note:
Symbol "⊥" means that the crossing angle is rectangular.
Symbol "=" means parallel.

EXAMPLE 9

70 – 95% By weight of a Schiff base type equi-weight mixture, having mesomorphic range of −15° C to 60° C, of p-methoxybenzylidene-p'-n-butylaniline (MBBA) and p-ethoxybenzylidene -p'-n-butylaniline (EBBA), as a Nn-liquid crystal composition were incorporated with 5 – 30% by weight of the positive dielectric anisotropy-imparting agent given in Table 3. The composition obtained thus was in form of homogeneous miscibility and exhibited a broad mesomorphic range extending above and below room temperature.

Table 3

| Run No. | Positive Dielectric Anisotropy-Imparting Agents | Amount of Addition, Weight % | Mesomorphic Range, ° C |
| --- | --- | --- | --- |
| 23 | NO$_2$—⟨○⟩—N=N(O)—⟨○⟩—OC$_2$H$_5$ | 5 | −20 ~ 56 |
| 24 |  | 10 | −15 ~ 45 |
| 25 |  | 20 | 30 ~ 51 |
| 26 |  | 30 | 31 ~ 58 |
| 27 | Cl—⟨○⟩—N=N(O)—⟨○⟩—C$_2$H$_5$ | 5 | −12 ~ 43 |
| 28 |  | 10 | −15 ~ 45 |
| 29 |  | 20 | −18 ~ 48 |
| 30 |  | 30 | −19 ~ 50 |
| 31 | Cl—⟨○⟩—N=N(O)—⟨○⟩—OCH$_3$ | 5 | −18 ~ 40 |
| 32 |  | 10 | −10 ~ 40 |
| 33 |  | 20 | −10 ~ 41 |
| 34 |  | 30 | −10 ~ 43 |
| 35 | Br—⟨○⟩—N=N(O)—⟨○⟩—OC$_2$H$_5$ | 5 | −13 ~ 30 |
| 36 |  | 10 | −10 ~ 18 |
| 37 |  | 20 | −10 ~ 0 |
| 38 |  | 30 | −11 ~ −5 |

EXAMPLE 10

90% By weight of an azo type mixture, having a mesomorphic range of 29° to 72° C, of 25% by weight of p-ethoxy-p'-n-amylazobenzene and 75% by weight of p-methoxy-p'-amylazobenzene, as a Nn-liquid crystal composition were incorporated with 10% by weight of a compound of the formula,

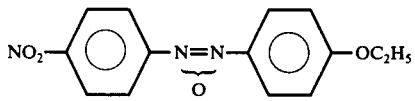

The composition obtained thus (Run No. 39) was in the form of homogeneous miscibility and exhibited a mesomorphic range of 20° to 63° C.

EXAMPLE 11

80% By weight of an azoxy type equi-weight mixture, having a mesomorphic range of 10° to 87° C, of p-ethoxy-p'-n-hexylazoxybenzene and p-methoxy-p-'-n-hexylazoxybenzene as a Nn-liquid crystal composition were incorporated with 20% by weight of a compound of the formula,

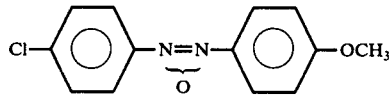

The composition obtained thus (Run No. 40) was in the form of homogeneous miscibility and exhibited a mesomorphic range of 5° to 73° C.

EXAMPLE 12

10% By weight of a compound of the formula,

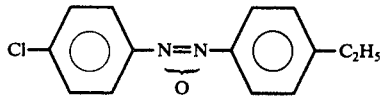

were incorporated with 90% by weight of an ester type Nn-liquid crystal material of the formula,

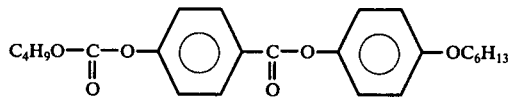

having a mesomorphic range of 44° to 84° C. The composition obtained thus (Run No. 41) was in the form of homogeneous miscibility and exhibited a mesomorphic range of 25° to 63° C.

EXAMPLE 13

10% By weight of a compound of the formula,

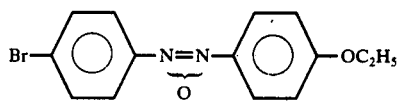

were incorporated with 90% by weight of an equi-weight mixture, having a mesomorphic range of −35° to 76° C, of MBBA, EBBA, p-ethoxybenzylidene-p'-n-heptylaniline ($EBH_pA$) and p-ethoxybenzylidene-p'-n-octylaniline as a Nn-liquid crystal composition. The composition obtained thus (Run No. 42) was in the form of homogeneous miscibility and exhibited a mesomorphic range of −40° to 40° C.

EXAMPLE 14

10% By weight of a compound of the formula,

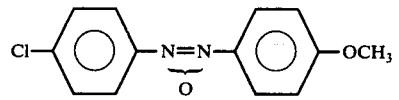

were incorporated with 90% by weight of a Nn-liquid crystal mixture of p-cyanophenyl-p'-n-heptylbenzoate and p-cyanophenyl-p-'-n-butylbenzoate in the weight ratio of 2 : 1, having a mesomorphic range of 25° to 50° C. The composition obtained thus (Run No. 43) was in the form of homogeneous miscibility and exhibited a mesomorphic range of 13° to 42° C.

EXAMPLE 15

10% By weight of a compound of the formula,

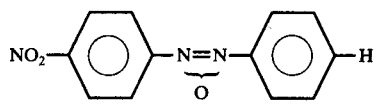

were incorporated with 90% by weight of an equi-weight mixture, having a mesomorphic range of −15° to 61° C, of MBBA and EBBA as a Nn-liquid crystal composition. The composition obtained thus (Run. No. 44) was in the form of homogeneous miscibility and exhibited a mesomorphic range of −15° to 50° C.

EXAMPLE 16

A light modulation apparatus as mentioned hereinbefore was prepared using the specimens of Run Nos. 24, 28, 33, 37, 39, 40, 41, 42, 43, and 44 changing a crossing angle of the rubbing directions on two substrates and a crossing angle of two polarizer. Threshold and saturation voltage values and changes in transmission light according to the variation of the application of from the threshold voltage to the saturation voltage are indicated in Table 4.

Table 4

| Specimens, Run No. | Crossing Angle of Rubbing Directions | Crossing Angle of Polarizing Plates | Threshold Voltages($V_{RMS}$) | Saturation Voltages($V_{RMS}$) | Changes in Transmission Light |
| --- | --- | --- | --- | --- | --- |
| 24 | ⊥ | = | 4.3 | 5.3 | Black-White |
| 24 | 45° | ⊥ | 3.8 | 5.1 | White-Red-Blue |
| 28 | ⊥ | ⊥ | 3.2 | 9.3 | White-Black |
| 33 | ⊥ | = | 3.1 | 6.8 | Black-White |
| 37 | ⊥ | = | 2.8 | 7.1 | Black-White |
| 39 | ⊥ | = | 4.1 | 8.5 | Black-White |

Table 4-continued

| Specimens, Run No. | Crossing Angle of Rubbing Directions | Crossing Angle of Polarizing Plates | Threshold Voltages($V_{RMS}$) | Saturation Voltages($V_{RMS}$) | Changes in Transmission Light |
| --- | --- | --- | --- | --- | --- |
| 40 | ⊥ | = | 2.5 | 7.5 | Black-White |
| 40 | 45° | ⊥ | 3.1 | 6.2 | White-Red-Blue |
| 41 | = | ⊥ | 3.6 | 8.7 | White-Blue-Red-Black |
| 42 | ⊥ | = | 2.9 | 6.8 | Black-White |
| 43 | ⊥ | = | 2.8 | 6.2 | Black-White |
| 44 | ⊥ | = | 2.1 | 5.2 | Black-White |

Note:
Symbol "⊥" means that the crossing angle is rectangular.
Symbol "=" means parallel.

What we claim is:

1. A nematic liquid crystal composition with positive dielectric anisotropy which comprises a mixture of 2 to 50% by weight of at least one of compounds represented by the formula,

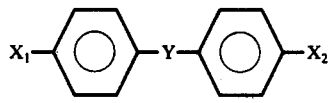

I wherein $X_1$ is halogen or a nitro group, $X_2$ is hydrogen or —R or —OR radicals wherein R is an alkyl group of 1 to 18 carbon atoms, and Y is —N=N— and 50 to 98% by weight of a nematic liquid crystal material.

2. A nematic liquid crystal composition of claim 1, wherein said nematic liquid crystal material is one having negative dielectric anisotropy.

3. A nematic liquid crystal composition of claim 2, wherein the nematic liquid crystal material having negative dielectric anisotropy is at least one of Schiff base type compounds represented by the formula,

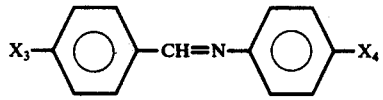

where $X_3$ is alkoxy of 1-4 carbon atoms and $X_4$ is alkyl of 3-8 carbon atoms and the formula,

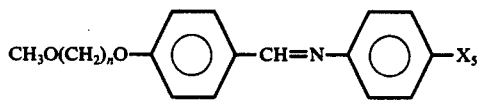

wherein $X_5$ is alkyl of 2-8 carbon atoms and n is 2 or 3.

4. A nematic liquid crystal composition of claim 2, wherein the nematic liquid crystal material having negative dielectric anisotropy is at least one of azo type compounds represented by the formula,

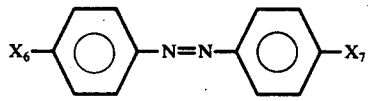

wherein $X_6$ and $X_7$ each is an alkyl or alkoxy group of 1-8 carbon atoms.

5. A nematic liquid crystal composition of claim 2, wherein the nematic liquid crystal material having negative dielectric anisotropy is at least one of azoxy type compounds represented by the formula,

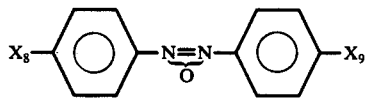

wherein $X_8$ and $X_9$ each is an alkyl or alkoxy group of 1-8 carbon atoms.

6. A nematic liquid crystal composition of claim 2, wherein the nematic liquid crystal material having negative dielectric anisotropy is at least one of ester type compounds represented by the formula,

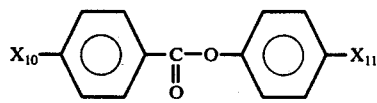

wherein $X_{10}$ is an alkyl or alkoxy group of 1-8 carbon atoms or acyloxyl

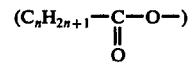

or monoalkyl carbonic acid ester

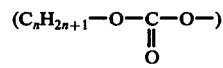

groups wherein n is an integer of 1 to 8 and $X_{11}$ is an alkyl or alkoxy group of 2-8 carbon atoms.

7. A nematic liquid crystal composition of claim 1, wherein said nematic liquid crystal material is one having positive dielectric anisotropy.

8. A nematic liquid crystal composition of claim 7 which comprises a mixture of 2 - 10% by weight of at least one of compounds represented by Formula I and 90 -98% by weight of a nematic liquid crystal material having positive dielectric anisotropy.

9. A liquid crystal electro-optical device containing a nematic liquid crystal composition with positive dielectric anisotropy which comprises a pair of electrode plates and a thin layer of the nematic liquid crystal composition of claim 1 supported between said two plates.

10. A light modulation apparatus comprising a pair of polarizers and the liquid crystal electro-optical device of claim 9 arranged between said two polarizers.

* * * * *